N. ORCUTT.
Churn.

2 Sheets—Sheet 1.

No. 42,821.

Patented May 17, 1864.

Fig. I.

Witnesses:

Inventor:

2 Sheets—Sheet 2.

N. ORCUTT.
Churn.

No. 42,821.

Patented May 17, 1864.

Witnesses:
S. W. Rogers
H. E. Conklin

Inventor:
Nelson Orcutt

UNITED STATES PATENT OFFICE.

NELSON ORCUTT, OF BINGHAMTON, NEW YORK, ASSIGNOR TO HIMSELF AND GEO. W. GREGORY.

PRODUCING BUTTER FROM MILK.

Specification forming part of Letters Patent No. 42,821, dated May 17, 1864.

*To all whom it may concern:*

Be it known that I, NELSON ORCUTT, of Binghamton, Broome county, and State of New York, have invented a new and useful improvement in producing butter from milk by passing through the milk a strong and steady blast or current of air; and I do hereby declare the following to be a full, clear, and exact description of the same, reference being had to the accompanying drawings, forming part of this specification, and to the letters of reference marked thereon.

Similar letters refer to corresponding parts.

Figure 1:
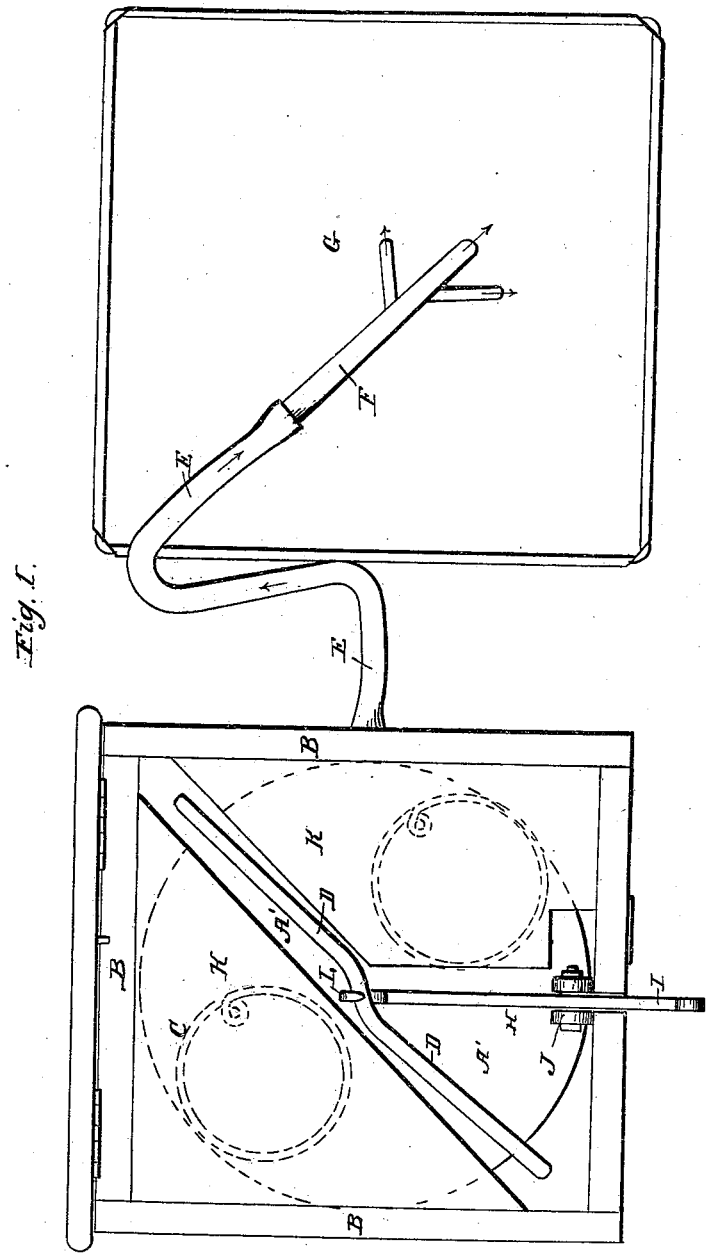
Figure 2:
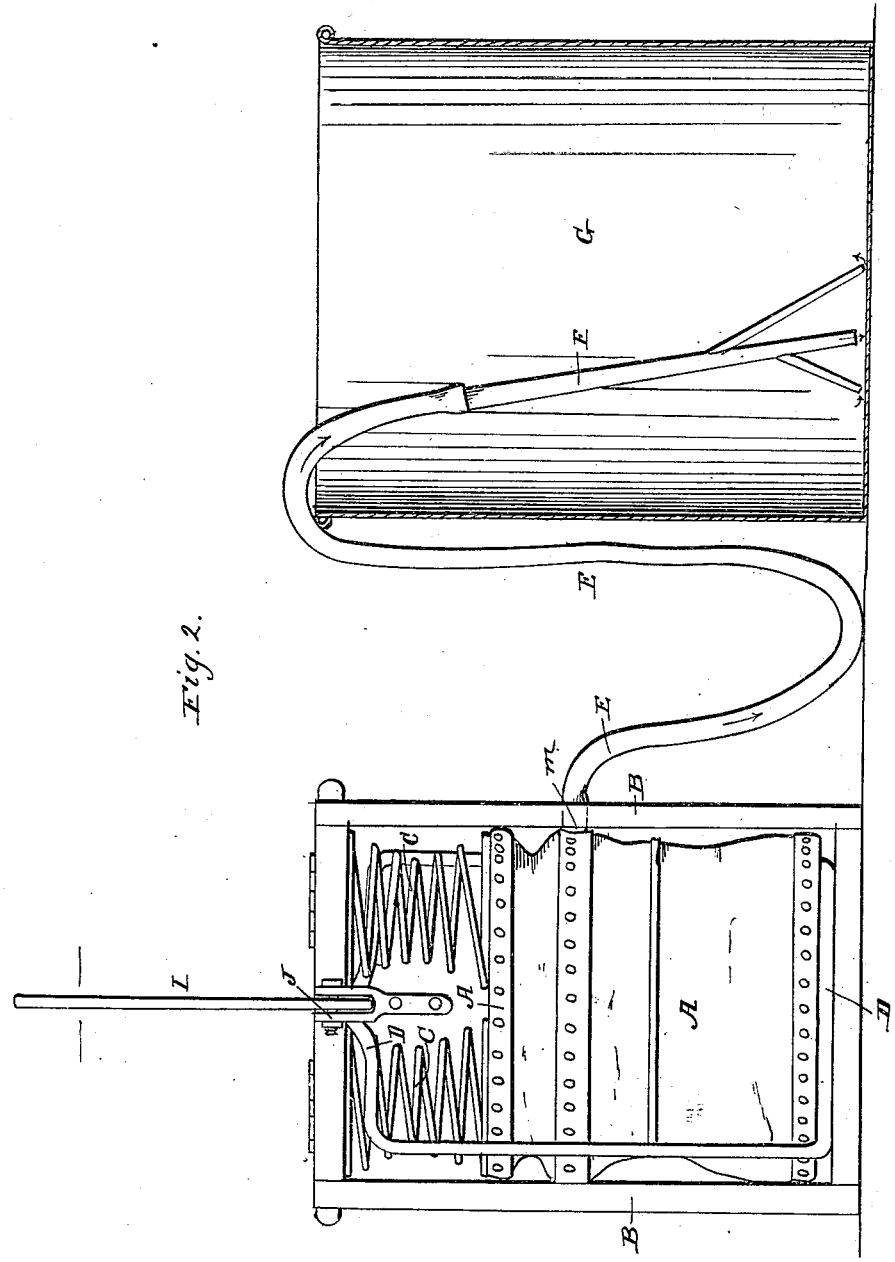

Figure 1 is a top view, and Fig. 2 is a side sectional view, of my improved devices as arranged when in operation.

My improvement relates to that class of churns known as "atmospheric;" and it consists in the combination and arrangement, hereinafter mentioned, of a bellows or blower having upon its top surface a spiral spring or springs and a flexible tube having upon its outer end a short tube or reed with or without radial arms or branches, as preferred. Through this flexible tube the air from the bellows is conducted to the milk, and the tube, being flexible, is moved about through the milk when and where desired, thus causing the milk in all portions of the vessel to be thoroughly agitated. I dispense with dashers and paddles, and use only the tube and air, which I can take from or put into the milk at will without connecting or disconnecting any of its parts. I am thus enabled to dispense with the ordinary churn and use any vessel of any shape for producing butter that will hold the milk.

To enable others skilled in the art to make and use my invention, I will proceed to describe its construction.

A is the bellows, which I generally place in a box B. On the head of the bellows A', I place two spiral springs, C C. These springs are held in position by the blocks K K, which press upon their tops, Fig. 1. These blocks are attached to the inner top corners of the box B. The springs assist the bellows, by their resistance against the head A', in blowing a steady blast of air into the milk. I H is a lever working on a fixed fulcrum, J, attached to the side of the box B, the long arm I of which serves as a handle to work the bellows. The short arm H is provided with a hook, L, which hooks into the bail D of the bellows, which can now be operated by moving the lever I backward and forward.

m is a short tube from the bellows, over which I slip the flexible tube E, through which the air is passed, as shown by the arrows, to and into the milk. This tube can be of any desired length and the air can be cooled or heated, if desired, by the interposition of any suitable arrangement, not necessary to be shown, such as a box containing ice or cold or warm water. On the farther end of this tube I place another short tube or reed with or without the branches, as desired. G is the vessel for containing the milk, and in which the tube is left free, to be moved, as desired, through the milk, thus agitating the whole body of the milk in every portion of the vessel.

I do not claim the making of butter from milk by the blast of air alone; neither do I claim the combination of stationary tubes with dashers, paddles, or floats of ordinary churns.

What I do claim, and desire to secure by Letters Patent, is—

1. The combination and arrangement of the bellows, springs, flexible tube, and the free second tube F, operating as and for the purpose described.

2. The combination and arrangement of the bellows, lever, springs, and bail, as and for the purpose described.

NELSON ORCUTT.

Witnesses:
S. W. ROGERS,
M. E. CONKLIN.